(12) United States Patent
Hussein

(10) Patent No.: US 10,793,752 B2
(45) Date of Patent: Oct. 6, 2020

(54) HOT MELT ADHESIVE COMPOSITION COMPRISING AT LEAST ONE PARTICULAR ALDEHYDE SCAVENGER

(71) Applicant: BOSTIK SA, La Plaine Saint Denis (FR)

(72) Inventor: Naji Hussein, Compiegne (FR)

(73) Assignee: BOSTIK SA, Colombes (FR)

( * ) Notice: Subject to any disclaimer, the term of this patent is extended or adjusted under 35 U.S.C. 154(b) by 741 days.

(21) Appl. No.: 15/374,632

(22) Filed: Dec. 9, 2016

(65) Prior Publication Data

US 2017/0166785 A1 Jun. 15, 2017

(30) Foreign Application Priority Data

Dec. 11, 2015 (EP) .................................... 15306986

(51) Int. Cl.
| | |
|---|---|
| *C09J 11/06* | (2006.01) |
| *C09J 123/08* | (2006.01) |
| *C09J 153/02* | (2006.01) |
| *C09J 123/02* | (2006.01) |
| *B32B 5/02* | (2006.01) |
| *B32B 7/12* | (2006.01) |
| *C09J 123/00* | (2006.01) |
| *C09J 153/00* | (2006.01) |
| *C08K 5/18* | (2006.01) |

(52) U.S. Cl.
CPC ............... *C09J 11/06* (2013.01); *B32B 5/022* (2013.01); *B32B 7/12* (2013.01); *C09J 123/00* (2013.01); *C09J 123/02* (2013.01); *C09J 123/0853* (2013.01); *C09J 153/00* (2013.01); *C09J 153/02* (2013.01); *B32B 2307/726* (2013.01); *C08K 5/18* (2013.01)

(58) Field of Classification Search
CPC . C09J 11/06; C09J 11/08; C09J 109/06; C09J 123/00; C09J 123/02; C09J 123/0853; C09J 153/00; C09J 153/005–025; C09J 153/02; C09J 161/18–32; C09J 187/005; C09J 2201/61; C09J 2453/00; C08G 2170/20–40; C08L 2555/84; C08L 2205/035; C08K 5/18; C08K 5/20; B32B 5/022; B32B 7/12; B32B 2307/726
See application file for complete search history.

(56) References Cited

U.S. PATENT DOCUMENTS

| | | | |
|---|---|---|---|
| 7,910,794 B2 | 3/2011 | Quinn et al. | |
| 2002/0193481 A1* | 12/2002 | Rule ...................... | C08F 6/006 524/284 |
| 2005/0032963 A1* | 2/2005 | Harwell ................. | A61L 15/46 524/474 |
| 2008/0146710 A1* | 6/2008 | Han ....................... | C09J 131/04 524/217 |
| 2008/0221546 A1 | 9/2008 | Quinn et al. | |
| 2014/0331601 A1 | 11/2014 | Jorissen et al. | |
| 2014/0371703 A1* | 12/2014 | Davis ..................... | C09J 123/16 604/385.03 |

FOREIGN PATENT DOCUMENTS

WO 2008109316 A1 9/2008

OTHER PUBLICATIONS

National Center for Biotechnology Information. PubChem Database. 2-Aminobenzamide, CID=6942, https://pubchem.ncbi.nlm.nih.gov/compound/2-Aminobenzamide.*
European Search Report for EP15306986 dated Jun. 7, 2016.

* cited by examiner

*Primary Examiner* — Laura C Powers
*Assistant Examiner* — Larissa Rowe Emrich
(74) *Attorney, Agent, or Firm* — Millen, White, Zelano and Branigan, P.C.

(57) ABSTRACT

The present invention relates to a hot melt adhesive composition comprising at least one particular aldehyde scavenger, and the use of said aldehyde scavenger(s) to remove or reduce the volatile organic compound(s) (VOC), particularly volatile aldehyde(s) of a hot melt adhesive composition.

The hot melt adhesive compositions according to the invention emit low odor during and after their manufacture and application, and are thus particularly useful to manufacture low odor disposable nonwoven absorbent articles.

15 Claims, No Drawings

HOT MELT ADHESIVE COMPOSITION COMPRISING AT LEAST ONE PARTICULAR ALDEHYDE SCAVENGER

The present invention relates to a hot melt adhesive composition comprising at least one particular aldehyde scavenger as further defined below, and the use of said aldehyde scavenger(s) to remove or reduce the volatile organic compound(s) (VOC), particularly volatile aldehyde(s) of a hot melt adhesive composition.

The hot melt adhesive compositions according to the invention emit low odor during and after their manufacture and application, and are thus particularly useful to manufacture low odor disposable nonwoven absorbent articles.

BACKGROUND OF THE INVENTION

Disposable nonwoven absorbent articles have a widespread acceptance for infant, young child, incontinent adult and feminine care applications.

The term "disposable" is used herein to describe absorbent articles which are intended to be discarded after a single use. Such articles are not intended to be laundered or otherwise re-used as an absorbent article.

The term "nonwoven" is used herein to describe a fabric comprised of an interlocking fiber network, and employed in the construction of disposable absorbent articles.

Typical disposable nonwoven absorbent articles include disposable diapers, training pants, adult incontinent pads and briefs, feminine sanitary napkins or pads. These items are aimed to receive and contain urine and other body fluids that the wearer secretes, and are usually worn against or in close proximity to the skin of the wearer.

To manufacture disposable nonwoven absorbent articles, hot melt adhesive compositions are generally used to bond together various substrates of said articles, as they provide rapid bonding compared to other adhesives such as water-based or solvent-based adhesive compositions, which require a drying step of the water or solvent.

Hot melt adhesive compositions suitable to this purpose should possess the appropriate bond strength to adhere the substrates involved. They should also possess good flexibility when an adhesive bonding resistant to deformations is desired. The said hot melt adhesive compositions should also possess suitable viscosity and suitable open time to be applied using conventional hot melt adhesive coating equipments at high speed lines. They should have acceptable thermal stability under the manufacture and application conditions thereof. In addition, they should not stain or bleed through the substrate(s) once applied thereon.

The substrates and hot melt adhesive compositions generally used in the manufacture of disposable nonwoven absorbent articles have the potential to emit an odor perceptible by human nose. In the case of hot melt adhesive compositions, this odor results from the release of organic volatile compound(s) (VOC) such as volatile aldehyde(s) present in the raw materials used to manufacture the hot melt adhesive compositions, or subsequently generated during the manufacture process and the application process of said hot melt adhesive compositions.

Thus, using raw materials (RM) with low VOC content might be a potential solution to reduce the total VOC content into the hot melt adhesive. However, this solution is not fully satisfactory, as further VOC can be generated during the manufacturing and the application processes of the hot melt adhesive compositions, during which the raw materials are exposed for a long time at a high temperature (140-170° C.). Moreover, these raw materials are expensive and hardly available commercially.

During the manufacturing process at industrial scale, hot melt adhesive compositions are typically heated for several hours (at least 4 hours) at 150-170° C. to melt and mix all the raw materials. The compositions may further be kept under melted state for up to an additional 15 hours before being cooled down.

During the application process at industrial scale, hot melt adhesive compositions are typically heated for several hours (at least 2 hours) at 140-170° C. to render the compositions fluid enough to be applied using conventional hot melt adhesive coater lines. The compositions may further be kept in a melting kettle for up to 4 days, before being applied.

Under these manufacturing and application process conditions, it was found that raw materials comprising at least one carbon-carbon double bond, such as most plasticizer(s), thermoplastic polymer(s) and tackifier resin(s), which are typically used in hot melt adhesive compositions undergo a thermal and oxidative degradation by a radical reaction, leading to the release of undesirable volatile organic compound(s), especially undesirable volatile aldehyde(s).

The term "volatile aldehyde" is used herein to describe a hydrocarbon compound in $C_1$-$C_{20}$, and preferably in $C_1$-$C_{12}$, comprising at least one aldehyde group (—CH=O). In particular, the term "volatile aldehyde" includes the above-mentioned compounds having a vapor pressure exceeding 0.1 millimeters of mercury (mm Hg) (i.e. about 13.3 Pascal (Pa)) at standard conditions (i.e. 20° C. and 760 mm Hg).

Volatile aldehydes are undesirable when they present the disadvantage to display a strong and/or unpleasant odor even at low content in the hot melt adhesive composition, and/or are irritant for the respiratory system at higher content.

These drawbacks are particularly troublesome for the operator manufacturing and/or applying such hot melt adhesive composition, but also for the end-user of an assembly product bonded with such hot melt adhesive composition and wrapped in a an airtight package. In particular, customers of disposable non woven absorbent articles usually complain about the strong and malodorous smell noticeable at the opening of the airtight package.

There is thus a need to remove or reduce the presence of volatile aldehyde(s), and preferably undesirable volatile aldehyde(s), within hot melt adhesive compositions, in particular to lower the odor impact of said hot melt adhesive composition, especially when it is used in the manufacture of low odor disposable nonwoven absorbent articles.

To meet this need, different solutions were explored, but none of them were fully satisfactory.

Indeed, it is known that working under lower temperature and/or under nitrogen atmosphere during the manufacturing and application processes of the hot melt adhesive compositions reduce the generation of volatile aldehyde(s) as thermal oxidation is lowered, and may thus lead to lower odor. However, this solution to remove or reduce the presence of volatile aldehyde released by hot melt adhesive compositions is not satisfactory for several hot melt adhesive compositions which require to be heated for a long time at high temperature (140-170° C.) to be melted. Besides, working under nitrogen atmosphere is not considered to be an economical solution and may cause critical security concerns. Therefore, there is a substantial need for an economical and practical solution to remove or reduce the volatile aldehyde part brought by the hot melt adhesive composition to the finished disposable nonwoven article.

US 2014,331,601 teaches using from 0.5 to 10% by weight of VOC sorbent particles to reduce VOC emission within a hot melt adhesive composition comprising from 5 to 80% by weight of thermoplastic polymer and from 20 to 70% by weight of tackifying agent, with a viscosity of no greater than 15000 centipoises at 177° C. The hot melt adhesive composition may also comprise from 5 to 35% by weight of a plasticizer.

The resulting hot melt adhesive composition was taught to emit a total amount of VOC of at least 20% less, relatively to the same composition comprising no sorbent particles. Among the VOC sorbent particles used, mention may be made of silica gel, activated carbon, zeolites, and cyclodextrine. These sorbent particles are porous and capable to trap in their molecular sieves the VOC emitted during the manufacture process of the hot melt adhesive composition, by physical adsorption.

However, these sorbent particles were not found to be fully satisfactory as desorption of the trapped VOC occurred when the hot melt adhesive was submitted to a subsequent step of heating such as during the application process of said adhesive.

Moreover, although this document taught that the hot melt adhesive composition disclosed were free of settling, settling was unexpectedly observed when using cyclodextrine as sorbent particles in the hot melt adhesive composition, in particular during the manufacture or the application process of said compositions where the hot melt adhesive compositions and the sorbent particles are heated at about 150° C. or above.

Besides, settling of inorganic sorbent particles and/or degradation of organic sorbent particles may also cause filter blocking issues during the application process of the hot melt adhesive composition.

SUMMARY OF THE INVENTION

Surprisingly, it was found that by using aldehyde scavenger(s) as defined below, it was possible to remedy the deficiencies of the prior art.

Indeed, contrary to the sorbent particles used in the prior art, it was found that the aldehyde scavenger(s) used according to the invention enable to efficiently and irreversibly neutralize the volatile aldehyde(s) leading to a hot melt adhesive composition of lower volatile aldehyde(s) content, even after having undergone a long period of exposure to high temperature, or repeated melting and cooling cycles, as this may occur during the manufacturing and application processes of conventional hot melt adhesive compositions.

Without being bound by the theory, it is assumed that when volatile aldehyde(s) is (are) present in the hot melt adhesive composition or generated at high temperature during the manufacturing or application process of said adhesive composition, the aldehyde scavenger(s) used according to the invention chemically react(s) with the aldehyde group(s) of the volatile aldehydes, to form an odorless product of higher molecular weight.

Adding at least an aldehyde scavenger used according to the invention in a hot melt adhesive composition was thus found to be useful to remove or reduce efficiently the amount of volatile aldehyde(s) present in said hot melt adhesive composition. The volatile aldehyde(s) present in the hot melt adhesive compositions may appear during and/or after the manufacturing and application processes of said hot melt adhesive composition, or may come from the raw materials used to manufacture the hot melt adhesive compositions, as explained above.

Therefore, using such said aldehyde scavenger(s) was found especially useful to lower the odor impact of hot melt adhesive composition displaying odor issues and in a larger extend lower the odor impact on the disposable non woven absorbent article comprising such hot melt adhesive composition.

Indeed, it was found that the hot melt adhesive composition according to the invention emits less volatile aldehyde and thus less VOC, and displays a less intense odor after manufacturing and/or application processes, in comparison to the corresponding hot melt adhesive composition of same nature but comprising no aldehyde scavenger (denoted reference composition).

The hot melt adhesive composition according to the invention was also found to display a less unpleasant smell after the manufacturing and/or application processes of said composition.

The intensity and pleasantness (hedonic tone) of the VOC emission(s), and especially the volatile aldehyde(s) emission(s), released by the hot melt adhesive may be assessed by any methods known in the olfactory field, such as those illustrated in the examples of the present application.

Moreover, the aldehyde scavenger(s) used according to the invention was (were) also found to be thermally stable to undergo a long or repeated period of exposition(s) to high temperature as during the typical manufacturing and application processes the hot melt adhesive composition (several hours at 140-170° C.) at industrial scale.

The hot melt adhesive composition according to the invention also presents good adhesive properties, as mentioned above and is especially suited to be used to manufacture disposable non woven absorbent articles such as those mentioned above. In particular, the hot melt adhesive composition according to the invention presents a good bonding strength on substrates usually used for the assembly, and in particular the construction, of disposable non woven absorbent articles.

A further advantage of the present hot melt adhesive composition is that the aldehyde scavenger(s) used according to the invention was (were) found to be fully miscible with the adhesive's raw materials and melts (melt) below the hot melt adhesive composition's melting point, avoiding any settling and/or filter blocking issues.

Other features and advantages will be apparent from the following description including the preferred embodiments and example, and from the claims.

In the present application, unless stated otherwise, the Ring and Ball Softening Point is measured according to the ASTM E 28.

DETAILED DESCRIPTION OF THE INVENTION

According to a first object of the invention, the present application relates to a hot melt adhesive composition comprising:

A—from 5% by weight of at least one thermoplastic polymer chosen from polyolefins, styrene block copolymers (SBC), ethylene-vinyl-acetate (EVA), and mixture thereof;

B—from 20% to 70% by weight of at least one tackifying resin;

C—from 0.01% to 1%, preferably from 0.09% to 0.5%, by weight of at least one aldehyde scavenger having a molar weight lower than 500 g/mol and a melting point below 170° C. and comprising in its structure an aromatic ring directly or indirectly bonded to at least one amine terminated group, as defined below, and preferably chosen from 2-aminobenzamide, 3-aminobenzamide, 1,8-diaminonaphtalene, 2-aminobenzenesulfonamide, benzene-1,2-diamine, and mixture thereof;

D—from 5% to 35% by weight, preferably from 10% to 30% by weight, of at least one plasticizer chosen from naphthenic oils, paraffinic oils, and mixture thereof; with preferably E—from 0.1% to 2% by weight of at least one antioxidant;

the total content of the above mentioned ingredients totaling 100% by weight.

The content of the above mentioned ingredients (A to E) in the hot melt adhesive composition, given in percentage by weight, are expressed relatively to the total weight of the hot melt adhesive composition.

The hot melt adhesive composition according to the invention may or may not display pressure sensitive properties.

In the former case, the hot melt adhesive composition according to the invention is a hot melt pressure sensitive adhesive composition (HMPSA), i.e. an adhesive composition combining both hot melt and pressure sensitive properties.

In the latter case, the hot melt adhesive composition according to the invention is a non-pressure sensitive hot melt adhesive composition, i.e. an adhesive composition displaying hot melt property, but no pressure sensitive property.

The term "hot melt" is used herein to describe that the adhesive composition requires to be heated at least at 120° C., and preferably at least 140° C., to be applied on a substrate. The hot melt adhesive composition is thus solid at 23° C.

The term "pressure sensitive" is used herein to describe that the adhesive composition is tacky at 23° C. and thus sticky when finger pressure is applied.

According to a particular embodiment of the invention, the hot melt adhesive composition is a HMPSA which comprises:

A—from 15% to 35% by weight of at least one thermoplastic polymer chosen from polyolefins, styrene block copolymers (SBC), ethylene-vinyl-acetate (EVA), and mixture thereof;

B—from 30% to 60% by weight of at least one tackifying resin;

C—from 0.01% to 1% by weight, preferably from 0.09% to 0.5% by weight, of at least one aldehyde scavenger having a molar weight lower than 500 g/mol and a melting point below 170° C. and comprising in its structure an aromatic ring directly or indirectly bonded to at least one amine terminated group, as defined below, and preferably chosen from 2-aminobenzamide, 3-aminobenzamide, 1,8-diaminonaphtalene, 2-aminobenzenesulfonamide, benzene-1,2-diamine, and mixture thereof;

D—from 10% to 30% by weight of at least one plasticizer chosen from naphthenic oils, paraffinic oils, and mixture thereof; with preferably E—from 0.1% to 5% by weight of at least one antioxidant;

the % by weight are given relatively to the total weight of the hot melt adhesive composition, and the total content of the above mentioned ingredients totaling 100% by weight.

The content of the above mentioned ingredients (A to E) in the hot melt pressure sensitive adhesive composition, given in percentage by weight, are expressed relatively to the total weight of the hot melt pressure sensitive adhesive composition.

Both HMPSA and non-pressure sensitive hot melt adhesive compositions according to the invention are useful in the manufacture of disposable non woven absorbent articles.

In particular, the non-pressure sensitive hot melt adhesive compositions according to the invention are useful for example as adhesive for elastic or stretch attachment, or to provide integrity (i.e. internal cohesion) of absorbent core typically made of a mixture of fluff and super absorbent polymer (SAP) or of SAP.

The HMPSA according to the invention are useful in particular to make tapes which may be used for the waist-attachment of diapers, to provide integrity (i.e. internal cohesion) of absorbent core typically made of a mixture of fluff and super absorbent polymer (SAP) or of SAP, or as adhesive for the construction of disposable non woven absorbent articles.

The term "for the construction of disposable non woven absorbent articles" is used herein to describe that the adhesive is intended to bond different layers of substrate(s) of the disposable non woven absorbent article (typically the top sheet, the backsheet, and the absorbent core).

A—Thermoplastic Polymer

The thermoplastic polymer(s) A used according to the invention is (are) selected from polyolefins, SBC, EVA, and any mixture thereof.

In a first embodiment, the thermoplastic polymer(s) A may be chosen from polyolefins.

In a second embodiment, the thermoplastic polymer(s) A may be chosen from SBC and EVA, and more preferably from SBC.

Preferably, the thermoplastic polymer A used according to the invention has a melt index of less than 100, more preferably less than 60, and the hot melt adhesive composition according to the invention has a viscosity of less than 35 000 mPa·s at 163° C.

More preferably, the thermoplastic polymer A used according to the invention has a melt index from 3 to 50, and the hot melt adhesive composition according to the invention has a viscosity of less than about 20,000 mPa·s at 163° C.

Even more preferably, the thermoplastic polymer has a melt index greater than about 5 to 20, and the hot melt adhesive composition according to the invention has a viscosity of less than about 10 000 mPa·s. at 163° C.

With these ranges of viscosity mentioned above, the hot melt adhesive composition according to the invention can be applied easily through conventional coating nozzles.

The MFI may be measured by ASTMD 1238 or ISO1133 at 190° C. or 200° C. under a load of 2.16 kilograms (kg) or 5 kg.

The polyolefin(s) which may be used according to the invention include:
- copolymer(s) of ethylene and alphaolefin monomers, copolymer(s) of ethylene and non-alphaolefin monomers, and any mixture thereof,
- homopolymer and copolymer of polybut-1-ene, and any mixture thereof,
- copolymer(s) of ethylene vinyl acetate (EVA), copolymer(s) of ethylene acrylate, copolymer(s) of ethylene methacrylate, copolymer(s) of ethylene methyl acrylate, copolymer(s) of several of these monomers, and any mixture thereof.

The polyolefin(s) which may be used according to the invention are commercially available under a variety of trade designations including Affinity®, Versify® and Infuse® series from Dow Chemical company, Vestoplast® series from Evonik industries AG, Vistamaxx® series from ExxonMobil Chemical company, Licocene® from Clariant and L-Modu® from Idemitsu Kosan Co. Ltd, Evatane® series and Lotryl® series from Arkema.

Useful styrene block copolymer(s) useful according to the invention include linear or radial block copolymers comprising at least one non elastomeric block A being a polystyrene block and at least one elastomeric block B being a totally or partially hydrogenated or a non hydrogenated diene polymer block.

The styrene block copolymer useful according the invention may be chosen from the following copolymers, and mixtures thereof:
linear diblock copolymer of AB structure,
linear triblock copolymer of ABA structure,
radial block copolymers of the $(AB)_nY$ structure,
wherein:
A is a non elastomeric polystyrene block,
B is a elastomeric diene block polymer such as polybutadiene or polyisoprene block,
Y is a multivalent compound, and
n is an integer of at least 3.

The linear triblock copolymer of ABA structure may be used alone or in mixture with a linear diblock copolymer of AB structure.

The elastomeric block B can be post treated through partial or total hydrogenation to improve its heat stability.

Preferably, the styrene block copolymer useful according the invention is chosen from the following linear triblock copolymers:
styrene-butadiene-styrene copolymer (SBS) with or without styrene-butadiene diblock (SB),
styrene-isoprene-styrene copolymer (SIS) with or without styrene-isoprene diblock (SI),
styrene-ethylene-butylene-styrene copolymer (SEBS),
styrene-butadiene-butylene-styrene copolymer (SBBS),
styrene-ethylene-propylene-styrene copolymer (SEPS),
and any mixture thereof.

More preferably, the styrene block copolymer is a linear triblock copolymer of ABA structure, as defined above, and even more preferably a linear SIS or SBS triblock copolymer.

When the styrene block copolymer is a mixture of linear triblock copolymer of ABA structure and linear diblock copolymer of AB structure, as defined above, the linear diblock content preferably range from 1 to 60% by weight relative to the total weight of the triblock and diblock mixture.

The amount of the end blocks A in the linear triblock copolymer of ABA structure, as defined above, may range from 14 to 51% by weight, preferably from 20 to 40% by weight, relative to the total weight of the linear triblock copolymer of ABA structure or, in the case of a mixture of linear triblock and diblock copolymers of ABA and AB structures, relative to the total weight of the triblock and diblock mixture.

Useful commercial styrene block copolymers include KRATON D and G® series from Kraton Polymers, EUROPRENE Sol T® series from Versalis (Eni group), SOLPRENE® series from Dynasol Elastomers, and Taipol® and Vector® series from TSRC Corporation.

As example of useful styrene block copolymers, mention may be made of:
Kraton®D1152, a mixture of linear SBS triblock and SB diblock copolymers, with a styrene content of 29.5% by weight relative to the total weight of the mixture, an average molecular weight of around 122 000 g/mol, a MFI (measured according to ISO1133) of 8.5 grams (g)/10 minutes (mn) at 200° C. under a load of 5 kilograms (kg), and a SB diblock content of around 17% by weight relative to the total weight of the mixture.
Kraton® D1161, a mixture of linear SIS triblock and SI diblock copolymers, with a styrene content of 15% by weight relative to the total weight of the mixture, a MFI (measured according to ISO1133) of 9 g/10 mn at 200° C. under a load of 5 kg, an average molecular weight of around 220 000 g/mol, and a SI diblock content of around 19% by weight relative to the total weight of the mixture.
Taipol® SBS 4202 from TSRC Corporation, a linear SBS triblock copolymer with a styrene content of 40% by weight relative to the total weight of the triblock copolymer, a MFI (measured according to ASTM D1238) of 3-10 g/10 mn at 190° C. under a load of 5 kg, an average molecular weight of around 102 400 g/mol.
Vector® 4411 from TSRC Corporation, a linear SIS triblock copolymer with a styrene content of 44% by weight relative to the total weight of the triblock copolymer, a MFI (measured according to ASTM D1238) of 40 g/10 mn at 200° C. under a load of 5 kg, an average molecular weight of around 106 000 g/mol.

Among all the thermoplastic polymers A which may be used according to the invention, most preferred are chosen from ethylene-vinyl-acetate (EVA), linear styrene-isoprene-styrene (SIS) triblock copolymer, linear styrene-butadiene-styrene (SBS) triblock copolymer, linear styrene-ethylene-butylene-styrene (SEBS) triblock copolymer, and mixture thereof, said triblock copolymers being possibly in mixture with their corresponding diblock copolymers.

The hot melt adhesive composition according to the invention can be applied on any substrate by any conventional hot melt adhesive coating means and processes. In particular, the hot melt adhesive composition according to the invention is useful to bond various parts of a disposable non woven absorbent article, which may be made of one or several substrate(s).

The total amount of thermoplastic polymer(s) A used according to the invention preferably ranges from 10% to 80% by weight, more preferably from 15% to 45% by weight, and even more preferably from 20% to 35% by weight, relative to the total weight of the hot melt adhesive composition.

B—Tackifying Resin

The tackifying resin(s) B used in the hot melt adhesive compositions according to the present invention may comprise one or several carbon-carbon double bond(s) or may comprise no carbon-carbon double bond. In this latter case, saturated tackifying resin(s) may be prepared by total hydrogenation of the insaturated tackifying resin(s).

As used herein, suitable classes of tackifying resins include:
(a) natural and modified rosins such as, for example, gum rosins, wood rosins, tall-oil rosins, distilled rosins, hydrogenated rosins, dimerized rosins and polymerized rosins;
(b) glycerol and pentaerythritol esters of natural and modified rosins, such as, for example, the glycerol esters of pale wood rosin, the glycerol esters of hydrogenated rosin, the glycerol esters of polymerized rosin, the pentaerythritol esters of pale wood rosin, the pentaerythritol esters of hydrogenated rosin, the pentaerythritol esters of tall oil rosin and the phenolic modified pentaerythritol esters of rosin;

(c) polyterpene resins include hydrogenated polyterpene resins having a Ring and Ball softening point of from about 20° C. to 140° C., the latter polyterpene resins generally resulting from the polymerization of terpene hydrocarbons, such as the monoterpene known as pinene, in the presence of Friedel-Crafts catalysts at moderately low temperatures;

(d) phenolic-modified terpene resins such as, for example, those resulting from the condensation, in an acidic medium, of a terpene and a phenol;

(e) aliphatic (including cycloaliphatic) petroleum hydrocarbon resins (C5) having a Ring and Ball softening point of from about 60° C. to 140° C., said resins resulting from the polymerization of C5-hydrocarbon monomers; and the corresponding hydrogenated derivatives resulting from a subsequent total or partial hydrogenation thereof;

(f) aromatic petroleum hydrocarbons resins (C9) having Ring and Ball softening point of from about 60° C. to 140° C., said resins resulting from the polymerization of C9-hydrocarbon monomers; and the corresponding hydrogenated derivatives resulting from a subsequent total or partial hydrogenation thereof;

(g) aliphatic (including cycloaliphatic)/aromatic petroleum resins (C5/C9) having a Ring and Ball softening point of from about 60° C. to 140° C., said resins resulting from the polymerization of C5/C9-hydrocarbon monomers; and the corresponding hydrogenated derivatives resulting from a subsequent total or partial hydrogenation thereof.

As example of C5-hydrocarbon monomers useful to prepare the tackifying resins belonging to class (e) or (g), mention may be made of trans-1,3-pentadiene, cis-1,3-pentadiene, 2-methyl-2-butene, dicyclopentadiene, cyclopentadiene, cyclopentene, and any mixture thereof.

As example of C9-hydrocarbon monomers useful to prepare the tackifying resins belonging to class (f) or (g), mention may be made of vinyltoluenes, dicyclopentadiene, indene, methylstyrene, styrene, methylindenes, and any mixture thereof.

According to a particular embodiment of the invention, a mixture of two or more of the above described tackifying resins is used in the hot melt adhesive composition according to the invention.

The tackifying resin(s) B used according to the invention are commercially available.

As example of commercially available tackifying resin(s) B belonging to class (a), mention may be made of:
unmodified natural tall oil rosins from Arizona Chemical Company sold under the trade names Sylvaros® (85, 90 and NCY),
the partially hydrogenated rosin from Eastman sold under the trade name Foralyn® E and the fully hydrogenated rosin from Eastman sold under the trade name Foral® AX-E,
the dimerized rosin from Eastman sold under the trade name Dymerex®.

As example of commercially available tackifying resin(s) B belonging to class (b), mention may be made of:
Sylvalite® RE 100L, a pentaerythritol based tall-oil rosin ester, and
Sylvalite® RE 85L, a glycerol ester of tall oil rosin, both available from Arizona Chemical Company.

As example of commercially available tackifying resin(s) B belonging to class (c), mention may be made of:
the polyterpene tackifiers from Arizona Chemical company sold under the trade names Sylvagum® TR and Sylvares® TR series (7115, 7125, A25L, B115, M1115).

As example of commercially available tackifying resin(s) B belonging to class (d), mention may be made of:
the terpene phenol resins from Arizona Chemical Company sold under the trade names Sylvares® TP (96, 2040, 300, 7042, 2019).

As example of commercially available tackifying resin(s) B belonging to class (e), mention may be made of:
the aliphatic and cycloaliphatic petroleum hydrocarbon resins based on a C5-petroleum hydrocarbon fraction (such as a mixture of trans-1,3-pentadiene, cis-1,3-pentadiene, 2-methyl-2-butene, dicyclopentadiene, cyclopentadiene, cyclopentene), having a Ring and Ball softening point ranging from 60° C. to 140° C., from Eastman Company sold under the trade names Wingtack® 98, Wingtack® ET and Escorez® 1310LC,
the partially hydrogenated cycloaliphatic petroleum hydrocarbon resins based on a C5-petroleum hydrocarbon fraction and partially hydrogenated, having a Ring and Ball softening point ranging from 60° C. to 140° C., from Exxon Mobil sold under the tradename Escorez® 5400 series (5400, 5415, 5490).

As example of commercially available tackifying resin(s) B belonging to class (f), mention may be made of:
the aromatic petroleum hydrocarbon resins based on a C9-hydrocarbon petroleum fraction (such as a mixture of vinyltoluenes, dicyclopentadiene, indene, methylstyrene, styrene, methylindenes), having a Ring and Ball softening point of from about 60° C. to 140° C., available from Kolon Industries sold under the trade names Hikotack® (P-90, P110 S and P120 S).

As example of commercially available tackifying resin(s) B belonging to class (g), mention may be made of:
the partially hydrogenated cycloaliphatic modified aromatic petroleum hydrocarbon resins based on C5/C9-hydrocarbon petroleum fractions, having a Ring and Ball softening point of from about 60° C. to 140° C., from Exxon Mobil sold under the tradename Escorez® 5600 series (5600, 5615, 5690),
the non hydrogenated aliphatic modified aromatic hydrocarbon petroleum resin based on C5/C9-hydrocarbon petroleum fractions, having Ring and Ball softening points of from about 60° C. to 140° C., from Zeon sold under the trade name Quintone® DX390N.

The total amount of tackifying resin(s) B used according to the invention preferably ranges from 20% to 70% by weight, and more preferably from 35% to 60% by weight, relative to the total weight of the hot melt adhesive composition.

C—Aldehyde Scavenger

The at least aldehyde scavenger C used according to the invention comprises in its structure an aromatic ring directly or indirectly bonded to at least one amine terminated group, said aldehyde scavenger having a molar weight lower than 500 g/mol, preferably lower than 400 g/mol, and more preferably lower than 300 g/mol, and a melting point below 170° C., preferably below 140° C., and more preferably below 120° C.

The term "amine terminated group" is used herein to describe a monovalent group comprising in its structure at least one terminal amine group chosen from a primary amine ($NH_2$) and a secondary amine (NHR, with R being a hydrocarbon group such as alkyl, preferably in $C_1$-$C_7$).

The aromatic ring may be monocyclic or polycyclic, said aromatic ring being preferably formed of at least one 6-member hydrocarbon ring, such as a phenyl, benzyl or naphtalenic group.

The amine terminated group is preferably a primary amine or a secondary amine. The nitrogen atom of the amine terminated group may be directly bonded to the aromatic ring of the aldehyde scavenger C by a covalent bond or may be indirectly bonded to the aromatic ring of the aldehyde scavenger C through a divalent group chosen preferably from —C=O— and —SO$_2$—.

The aldehyde scavenger C used according to the invention may be symmetric or asymmetric. In particular, it may comprise an axis, plan or center of symmetry.

The aldehyde scavenger C used according to the invention is able to react chemically with any volatile aldehydes which may be present in the hot melt adhesive composition or generated in situ when the hot melt adhesive composition is heated especially for a long time at high temperature. The aldehyde scavenger C used according to the invention is thus able to neutralize irreversibly said volatile aldehydes.

The aldehyde scavenger(s) C used according to the invention can be present alone or in any desired blend, and functions to control and/or inhibit the odor of volatile aldehydes emitted from the hot melt adhesive composition.

In particular, the aldehyde scavenger C used according to the invention and the resulting product from the reaction between the aldehyde volatile and aldehyde scavenger should be substantially thermally stable at the temperature and time required for hot melt adhesive preparation and processing, preferably at 170° C. during 72 h.

The aldehyde scavenger(s) C used according to the invention should be compatible with the other raw materials or ingredients used in the hot melt adhesive composition and thus should not adversely affect the bonding performance or the thermal stability of the hot melt adhesive composition.

The aldehyde scavenger(s) C used according to the invention preferably should not contain any water or other solvents so that it is readily processable in hot melt mixing equipment, and should also be non-toxic for the end user.

According to a preferred embodiment, the aromatic ring is substituted by at least one primary amine $R^0$, the nitrogen atom of the primary amine $R^0$ being directly bonded to the aromatic ring of the aldehyde scavenger by a covalent bonding.

In a specific aspect of this embodiment, the aromatic ring may also be substituted by at least one amine terminated group $R^1$ identical or different from $R^0$, the two nitrogen atoms of $R^0$ and $R^1$, being preferably separated from one another by 2 or 3 atoms chosen from carbon atoms, heteroatoms such as sulfur atoms, and mixture thereof.

When the at least two nitrogen atoms of $R^0$ and $R^1$ are separated from one another by 2 or 3 atoms chosen from carbon atoms, heteroatoms such as sulfur atoms, and mixture thereof, the reaction of the aldehyde scavenger C used according to the invention with a volatile aldehyde leads to the formation of stable polycyclic product comprising a 5 or 6 member ring respectively.

When the aromatic ring of the aldehyde scavenger C used according to the invention is not substituted by a group $R^1$ or when $R^0$ and $R^1$ are not in a position favoring the formation of a stable polycyclic product comprising a 5 or 6-member ring, as mentioned above, the reaction of the primary amine(s) ($R^0$ and optionally $R^1$) directly bonded to the aromatic ring of the aldehyde scavenger C with the volatile aldehyde leads to the formation of an aldimine and water.

The nitrogen atom of $R^1$ may be directly bonded to the aromatic ring of the aldehyde scavenger by a covalent bond or may be indirectly bonded to the aromatic ring of the aldehyde scavenger through a divalent group chosen from —(C=O)— and —SO$_2$—, the two nitrogen atoms of $R^0$ and $R^1$ being preferably separated from one another by 2 or 3 atoms as defined above.

The aromatic ring of the aldehyde scavenger C used according to the invention substituted by at least one primary group $R^0$ as defined above and denoted first aromatic ring, may also be substituted by one group $R^4$ and one group $R^5$, positioned in ortho relative to each other, and fusing together to form a second aromatic ring adjacent to the first aromatic ring, so as to form a bicyclic group composed of said first aromatic ring and a second aromatic ring.

The second aromatic ring is preferably a phenyl group and forms with the first aromatic ring substituted by at least one primary amine group $R^0$, a naphthalene group substituted by at least one primary amine group $R^0$ as defined above. More preferably, the second aromatic ring is substituted with at least one primary amine group $R^7$, the nitrogen atom of the primary amine group $R^7$ being directly bonded to the second aromatic ring of the aldehyde scavenger C by a covalent bond and the two nitrogen atoms of $R^0$ and $R^7$ being preferably separated from one another by 3 carbon atoms.

Suitable aldehyde scavengers effective according to this first embodiment of the invention may be chosen from those corresponding to the following formula (I):

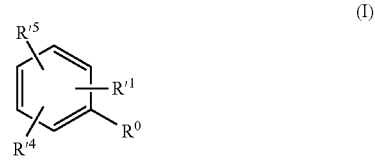

(I)

in which:
$R^0$ is NH$_2$,
$R'^1$ is chosen among a hydrogen atom and an amine terminated group chosen from a primary amine NH$_2$, a secondary amine —NH—$R'^6$, —SO$_2$—NH—$R'^3$ and —CONH—$R'^3$,
$R'^3$ being a hydrogen atom or a C$_1$-C$_7$ alkyl,
$R'^6$ being a C$_1$-C$_7$ alkyl,
$R'^4$ and $R'^5$ are chosen among a hydrogen atom, a C$_1$-C$_9$ alkyl, a primary amine NH$_2$, a secondary amine —NH—$R'^6$— as defined above or may fuse together, when positioned in ortho relative to each other, to form a (second) 6-member aromatic hydrocarbon ring such as a phenyl optionally substituted by at least one $R'^7$ group chosen among a hydrogen atom, and an amine terminated group chosen from a primary amine NH$_2$, a secondary amine —NH—$R'^6$, —SO$_2$—NH—$R'^3$ and —CONH—$R'^3$, as defined above.

When $R'^4$ and $R'^5$ are positioned in ortho relative to each other, and fuse together to form a (second) 6-member aromatic hydrocarbon ring as described above, they form with the (first) aromatic ring bearing $R^0$, a bicyclic group (composed of said first aromatic ring and a second aromatic ring). Preferably, $R'^4$ and $R'^5$ fuse together to form a 6-member aromatic hydrocarbon ring, such as a phenyl, substituted by at least one $R'^7$ group being a primary amine NH$_2$. More preferably, the two nitrogen atoms of the primary amine groups $R^0$ and $R'^7$ are preferably separated from one another by 3 carbon atoms of the bicyclic group.

When $R'^1$ is an amine terminated group as defined above, $R^0$ and $R'^1$ are preferably positioned in ortho relative to each other to favor the formation of a stable polycyclic product comprising a 5 or 6-member ring.

When $R'^1$ is —CONH—$R'^3$ or —$SO_2$—$NHR'^3$ as defined above and is positioned in ortho position relative to the primary amine $R^0$, the chemical reaction between the volatile aldehyde and the aldehyde scavenger C leads to the formation of water and a 6-member ring as illustrated for example below:

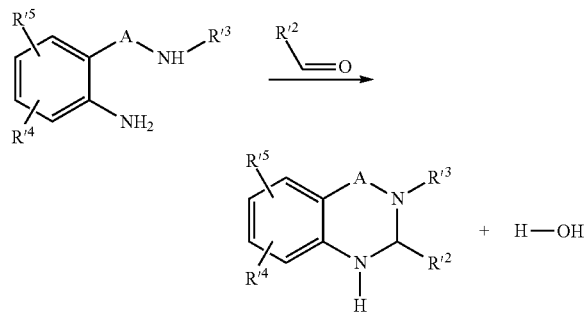

in which:

$R'^3$, $R'^4$ and $R'^5$ are as defined previously,

A is —CO— or —$SO_2$—, $R'^2$ is a hydrogen atom, or a $C_1$-$C_{11}$ preferably a $C_1$-$C_9$ hydrocarbon.

When $R^0$ and $R'^1$ are not at the position favoring the formation of a 5 or 6-member ring, the primary amine(s) ($R^0$ and optionally $R'^1$), directly bonded to the aromatic ring, reacts with the volatile aldehyde to form an aldimine and water as illustrated for example below, $R'^1$, $R'^2$, $R'^4$ and $R'^5$ being as defined previously:

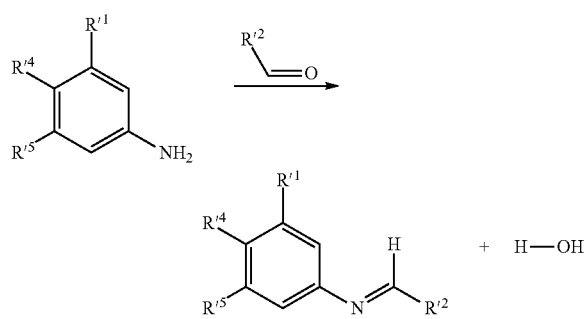

The aldehyde scavenger(s) C used according to the invention that meet the above requirements and are effective at decreasing the volatile aldehyde content of the hot melt adhesive composition include: 2-aminobenzamide, 3-aminobenzamide, 1,8-diaminonaphthalene, 2-aminobenzenesulfonamide, benzene-1,2-diamine, and mixture thereof.

Preferably the aldehyde scavenger(s) C used according to the invention is chosen from 2-aminobenzamide, 2-aminobenzenesulfonamide, and mixture thereof.

More preferably, the aldehyde scavenger(s) C used according to the invention is (are) 2-aminobenzamide (anthranilamide) as represented below:

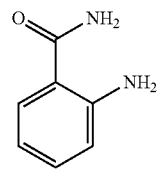

The amount of aldehyde scavenger(s) C used according to the invention may be adjusted depending on the used raw materials or ingredients, formulation and application processes, and the amount of volatile aldehyde(s) reduction required.

The amount of aldehyde scavenger(s) C used according to the invention ranging from 0.01% to 1% by weight enables to neutralize efficiently and at reasonable cost any volatile aldehyde likely to be present or generated in the hot melt adhesive compositions according to the invention. As explained before, the volatile aldehyde(s) may be result from the several melting and cooling cycles, and in particular the two melting and cooling cycles corresponding each to the manufacturing process and the application process of the hot melt adhesive composition.

The total amount of aldehyde scavenger(s) C used according to the invention thus enable to efficiently reduce or remove the VOC, and in particular the volatile aldehyde(s), and thus lower the odor of the hot melt adhesive composition due to these volatiles.

Preferably the amount of aldehyde scavenger(s) C used according to the invention should be sufficient to lead to a noticeable decrease of odor intensity and/or an improved odor pleasantness of the hot melt adhesive composition, as illustrated in the examples.

The total amount of aldehyde scavenger(s) C used according to the invention is preferably present in an amount ranging from 0.09% to 1% by weight, more preferably from 0.1 to 1% by weight, and even more preferably from 0.1% to 0.5% by weight, relative to the total weight of the hot melt adhesive composition.

D—Plasticizer

The plasticizer(s) D used according to the invention may be chosen from naphthenic and paraffinic oils typically used in hot melt adhesive compositions.

The plasticizer(s) D used according to the invention may confer good processability to the hot melt adhesive composition. Moreover, the plasticizer(s) D used according to the invention may also provide desired viscosity control without substantially decreasing the adhesive strength or the service temperature (temperature of use) of the hot melt adhesive.

Naphthenic oils and paraffinic oils are petroleum based oils which consists in a mixture of naphthenic hydrocarbons (aliphatic, saturated or unsaturated, $C_4$ to $C_7$-member hydrocarbon rings, and preferably aliphatic, saturated or unsaturated, $C_4$ to $C_6$-member rings. As way of example, mention may be made of cycloalkanes such as cyclopentane, cyclohexane, cycloheptane)), paraffinic hydrocarbons (saturated, linear or branched, alkanes) and aromatic hydrocarbons (aromatic hydrocarbon rings, which may be monocyclic or polycyclic, and preferably aromatic $C_6$-member hydrocarbon rings).

The classification of Naphthenic and Paraffinic oil is made based on the amount of each type of hydrocarbons in the oil. Typically, paraffinic oils have a paraffinic hydrocarbons content of at least 50% by weight; naphthenic oils have a naphthenic hydrocarbons content between 30% and 40% by weight, relative to the total weight of the plasticizer.

Preferably the plasticizer(s) D used according to the invention is a naphthenic oil.

Useful plasticizers D used according to the invention are commercially available. By way of example, mention may be made of the naphtenic oils from Nynas sold under the trade names Nyflex® 223 and Nyflex® 222B, which are preferably used.

Other plasticizer(s) may be added in the hot melt adhesive composition according to the invention in order to confer comparable or improved advantages to plasticizer D as mentioned above.

The total amount of plasticizer(s) D and other optional plasticizer(s) used according to the invention preferably should not exceed 30% by weight, relative to the total weight of the hot melt adhesive composition. Otherwise this might lead to lower adhesive properties and/or staining issues.

E—Antioxidant

Preferably, the hot melt adhesive composition according to the invention comprises from 0.1% to 2% by weight of at least one antioxidant E, relative to the total weight of the hot melt adhesive composition.

The antioxidant(s) E useful according to the invention is (are) preferably incorporated in the hot melt adhesive composition to help protect the hot melt adhesive composition from chemical degradations. Said degradations generally involve the reactions of free radicals, resulting from chain scission catalyzed either by ultraviolet light or heat, with dioxygen. Such degradation is usually manifested by a deterioration in the appearance (browning of color) or other physical properties of the adhesive, and in the performance characteristics of the adhesive.

In particular, the antioxidant(s) E useful according to the invention protect the adhesive from the effect of thermal degradations reactions which mainly occur during the manufacturing and application process of the adhesive where the hot melt adhesive composition and its ingredients are heated for a long time at high temperature in presence of dioxygen.

Useful antioxidant(s) E include hindered phenols and sulfur and phosphorus containing phenols. Hindered phenols are well known to those skilled in the art and may be characterized as phenolic compounds which also contain sterically bulky groups in close proximity to the phenolic hydroxyl group thereof. In particular, tertiary butyl groups generally are substituted onto the benzene ring in at least one of the ortho positions relative to the phenolic hydroxyl group.

Representative hindered phenols include:
1,3,5-trimethyl-2,4,6-tris(3-5-di-tert-butyl-4-hydroxybenzyl) benzene;
pentaerythritol tetrakis-3(3,5-di-tert-butyl-4-hydroxyphenyl) propionate;
n-octadecyl-3(3,5-ditert-butyl-4-hydroxyphenyl) propionate;
4,4'-methylenebis(4-methyl-6-tert-butylphenol);
4,4'-thiobis(6-tert-butyl-o-cresol);
2,6-di-tert-butylphenol;
6-(4-hydroxyphenoxy)-2,4-bis(n-octylthio)-1,3,5-triazine;
2,4,6-tris(4-hydroxy-3,5-di-tert-butyl-phenoxy)-1,3,5-triazine;
di-n-octadecyl-3,5-di-tert-butyl-4-hydroxybenzylphosphonate;
2-(n-octylthio)ethyl-3,5-di-tert-butyl-4-hydroxybenzoate;
sorbitol hexa-(3,3,5-di-tert-butyl-4-hydroxy-phenyl) propionate;
2,2'-methylene bis(4-methyl-6-tert-butylphenol)phosphites including, e.g., tris-(p-nonylphenyl)-phosphite (TNPP) and bis(2,4-di-tert-butylphenyl)4,4'-diphenylene-diphosphonite, di-stearyl-3,3'-thiodipropionate (DSTDP);
tetrakis(methylene(3,5-di-ter-butyl-4-hydroxyhydrocinnamate)) methane;
(tris(2,4-ditert-butylphenyl)phosphate), and combinations thereof.

The hindered phenol antioxidants may be used by themselves or in combination with other antioxidants, such as phosphites antioxidants like Irgafos® series, or aromatic amine antioxidants like Naugard® series from Addivant.

Useful antioxidants E are commercially available under a variety of trade designations including, e.g., the hindered phenolic antioxidants of Irganox® series from BASF including, e.g., Irganox® 1010 (tetrakis(methylene(3,5-di-ter-butyl-4-hydroxyhydrocinnamate)) methane), and Irgafos® 168 antioxidant (tris(2,4-ditert-butylphenyl)phosphate).

The total amount of antioxidant(s) E and other optional antioxidant(s) useful according to the invention is preferably present in an amount ranging from 0.1 to 3% by weight, and more preferably from 0.5% to 1% by weight, relative to the total weight of the hot melt adhesive composition.

The performance of the antioxidants useful according to the invention may be further enhanced by utilizing, in conjunction therewith: (1) synergists such as, for example, thiodipropionate esters and phosphites; and/or (2) chelating agents and metal deactivators as, for example, ethylenediamine tetraacetic acid, salts thereof, and disalicylalpropylenediimine.

F—Endblock Reinforcing Resin

When the hot melt adhesive composition according to the invention is intended to be used for highly demanding application requiring high adhesive cohesion and high resistance of the adhesive strength, the composition preferably comprises at least one endblock reinforcing resin F.

The endblock reinforcing resin F is primarily aromatic resins based on pure or mixed monomer streams of aromatic monomers. Typical examples of such aromatic monomers include aromatic C9-hydrocarbon monomer, styrene, alpha-methyl styrene, vinyl toluene. Preferred are those based on alpha-methyl styrene.

Useful end block reinforcing resins F are commercially available under a variety of trade names including, e.g Plastolyn® series from Eastman Chemical.

The endblock reinforcing resin F used according to the invention typically has a molecular weight from 5000 to 15000 g/mol.

The Ring and Ball Softening Points of the aromatic endblock resin F ranges preferably from 90° C. to 160° C., more preferably, from 100° C. to 140° C., and more preferably from 120° C. to 140° C.

When the endblock reinforcing resin(s) F is (are) present in the hot melt adhesive composition according to the invention, the total amount of endblock reinforcing resin(s) F preferably ranges from 3 to 20% by weight, and more preferably from 5 to 15% by weight, relative to the total weight of the hot melt adhesive composition.

Additional Optional Ingredient(s)

Other optional ingredient(s) may be incorporated into the hot melt adhesive composition according to the invention in order to modify particular physical properties of the hot melt adhesive composition.

Among the optional ingredients which may be used in the hot melt adhesive composition of the invention, mention may be made of fillers, surfactants, colorants, ultraviolet light stabilizers, fluorescent agents, rheology modifiers, and the like.

The total amount of the optional ingredient(s) which may be present in the hot melt adhesive composition according to the invention may range from 0% to 10% by weight, preferably from 0.1% to 5% by weight, and more preferably from 0.1% to 2% by weight, relative to the total weight of the hot melt adhesive composition.

According to preferred variant of the invention, the hot melt adhesive composition comprises:

A—from about 5% by weight, preferably from 15% to 35% by weight, of at least one styrene block copolymers (SBC);

B—from about 20% to about 70% by weight, preferably from 30% to 60% by weight, of at least one tackifying resin;

C—from about 0.01% to about 1% by weight, preferably from 0.09% to 0.5% by weight, of at least one aldehyde scavenger chosen from 2-aminobenzamide, 3-aminobenzamide, 1,8-diaminonaphtalene, 2-aminobenzenesulfonamide, benzene-1,2-diamine, and mixture thereof, preferably being 2-aminobenzamide;

D—from about 5% to about 35% by weight, preferably from 10% to 30% by weight, of at least one plasticizer chosen from naphthenic oils, paraffinic oils, and mixture thereof; with preferably E—from about 0.1% to about 2% by weight of at least one antioxidant;

the total content of the above mentioned ingredients totaling 100% by weight.

The content of the above mentioned ingredients (A to E) in the hot melt adhesive composition, given in percentage by weight, are expressed relatively to the total weight of the hot melt adhesive composition.

According to a variant of the invention, the ingredients and optional ingredients of the hot melt adhesive composition according to the invention are chosen preferably among those comprise few or preferably no carbon-carbon double bonds to limit the production of VOC, and especially volatile aldehydes. This variant is particularly useful to provide an odorless hot melt adhesive composition.

According to another object of the invention, the present application relates to a process of manufacture of the hot melt adhesive composition according to the invention comprising at least a step of mixing and heating at a temperature ranging from 140° C. to 170° C. the ingredients of the hot melt adhesive composition according to the invention, at least for a period of time long enough to melt the tackifying resin(s) B and the thermoplastic polymer(s) A.

The hot melt adhesive composition of the present invention may be produced using any of the techniques known in the art to manufacture a hot melt adhesive composition. The ingredients used to prepare the hot melt adhesive composition are preferably mixed and heated at high temperature for at least several hours, typically at least 4 hours, and preferably from 4 to 6 hours, at a temperature ranging from 140 to 170° C., at the industrial scale production (i.e. for the production of 3-6 metric tons of hot melt adhesive composition).

The hot melt adhesive composition according to the invention can be prepared in presence of dioxygen (such as under air atmosphere), or preferably under inert atmosphere e.g. under carbon dioxide or nitrogen to limit potential degradation by oxidative reactions.

According to a preferred embodiment, the process to manufacture the hot melt adhesive composition according to the invention comprises:

a first step of mixing and heating the tackifying resin(s) B, and the plasticizer(s) D, preferably with the antioxidant(s) E when present, at a temperature ranging from 120° C. to 140° C., at least for a period of time long enough to melt all the tackifying resin(s) B, a second step of adding the thermoplastic polymer (s) A into the mixture obtained in the previous step under stirring and heating at a temperature ranging from 150° C. to 170° C., at least for a period of time long enough to melt all the thermoplastic polymer(s) A, the aldehyde scavenger(s) C being possibly added either during the first step or during the second step in mixture with the other ingredients, or subsequently during a subsequent third step in the hot melt adhesive composition resulting from the second step at a temperature ranging from 150° C. to 170° C. under stirring.

In the first step of the process, the ingredients are mixed and heated at a temperature ranging from 120° C. to 140° C. for at least several hours, typically at least one hour and a half, and preferably from one hour and a half to three hours, at the industrial scale production.

In the second step of the process, the mixture is stirred and heated at a temperature ranging from 150° C. to 170° C. for at least several hours, typically at least two hours and a half, and preferably from 3 to 5 hours, at the industrial scale production.

In the third step of the process, the mixture is stirred and heated at a temperature ranging from 150° C. to 170° C. for at least 30 minutes (mn), and preferably from 30 mn to one hour.

Preferably, the aldehyde scavenger(s) are added in the first or second step to reduce the number of steps of the process, and thus simplify said process.

Additionally, the process of the invention may comprise a step of applying vacuum to remove any entrapped air in the mixture, before or after any of the step of process described previously.

Other useful optional ingredient(s) which may be present in the hot melt adhesive composition according to the invention may be added at any step of the process according to the invention.

The hot melt adhesive composition according to the invention, prepared by the above-described process may further be kept, for example in a melting kettle, under melted state for up to an additional 15 hours before being cooled down and packaged in form of a ready-to-use solid composition.

According to another object of the invention, the present application relates to a process of applying the hot melt adhesive composition according to the invention comprising a step of heating at a temperature ranging from 140° C. to 170° C. the hot melt adhesive composition according to the invention, for at least a period of time long enough to render the hot melt adhesive composition liquid enough to be applied on a substrate, for example at least two hours at industrial scale, then a step of applying said composition on a first substrate, and putting into contact the coated surface of the substrate with the surface of second substrate, so as to form an adhesive join bonding the two substrates.

The substrates may be different or of same nature, with various forms (layer or film, strands, fluff)

Preferably each substrate may be chosen independently from one another from nonwoven fabric, tissue, absorbent fluff, super absorbent polymer (SAP), composite material, plastics which may be elastomeric or non elastomeric, and which may be chosen for example from Styrene Block Copolymers (SBC), Polyurethane, and Polyolefin, and any mixture thereof.

The composite material may be made of at least one of the above-mentioned materials.

The hot melt adhesive composition according to the invention can be coated or applied with a variety of application techniques known in the art, which include contact type application and non-contact type application, using for example slot die coating and spraying or fiberlization, respectively.

In particular, as mentioned above, the hot melt adhesive composition according to the invention can be applied easily through conventional coating nozzles, such as those having a diameter from 0.03048 to 0.0762 cm or a slot die length adjustable by a shim and ranging from 20 μm to 300 μm.

Before being applied on the surface of the first substrate, the hot melt adhesive composition according to the invention may further be kept in a melting kettle for up to 4 days.

The hot melt adhesive composition according to the invention can be applied on a substrate or stored in presence of dioxygen (under air atmosphere), or preferably under inert atmosphere to limit degradations due to oxidative reactions.

According to another object of the invention, the present application relates to an assembly product comprising at least two substrates bonded by at least one hot melt adhesive composition according to the invention.

The hot melt adhesive composition according to the invention may be used as the laminating adhesive to bind a plurality of substrate layers for example to manufacture toilet tissues, paper towels, wipes and other consumer products, particularly absorbent articles such as disposable diapers.

In a particular embodiment of the invention, the assembly product according to the invention may be a multilayer product comprising at least two layers of substrate(s) bonded by at least one hot melt adhesive composition according to the invention.

In the assembly product according to the invention, the at least two layers of substrate(s) may be joined adhesively by a layer of hot melt adhesive composition according to the invention, in sandwich between the two layers of substrate(s).

Alternatively or cumulatively, the at least two layers of substrate(s) may be joined adhesively by spots of hot melt adhesive composition according to the invention.

Preferably, the assembly product is a disposable nonwoven absorbent article.

According to another object of the invention, the present application relates to the use of at least an aldehyde scavenger C used according to the invention to remove or reduce the volatile organic compound(s) (VOC), particularly volatile aldehyde(s) of a hot melt adhesive composition, which may be any hot melt adhesive composition likely to emit odor due to the presence of volatile organic compound(s) (VOC), particularly volatile aldehyde(s).

As example of hot melt adhesive compositions likely to emit such odor, mention may be made of the hot melt adhesive compositions described in the present application as reference compositions and which do not comprise (an) aldehyde scavenger(s) C used according to the invention.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding European application No. 15306986, filed Dec. 11, 2015, are incorporated by reference herein.

EXAMPLES

Effect of Aldehyde Scavenger on Two Neat Aldehyde Volatiles

Preparation of Gaseous Phase of Volatile Aldehyde:

Four vials A1, A2, A3 and A4 were prepared as follow:

15 μL of butyraldehyde (liquid at 23° C., boiling point (bp)=74.8° C.) were introduced with a syringe in a 20 mL vial A1 sealed with an airtight rubber cap, then the vial was filled with nitrogen. In the same manner, a second vial A2 is prepared.

15 μL of benzaldehyde (liquid at 23° C., bp=178.1° C.) were introduced with a syringe in a second 20 mL vial A3 sealed with an airtight rubber cap, then the vial was filled with nitrogen. In the same manner, a second vial A4 is prepared.

The four vials A1, A2, A3 and A4 were left to sit at 23° C. for at least 12 hours to equilibrate the repartition of gaseous phase of volatile aldehyde homogeneously in the vials.

Preparation of Vials A5 and A6 Comprising a Volatile Aldehyde without Aldehyde Scavenger C (Reference):

For comparative purpose, two vials A5 and A6 were prepared as follow:

3 mL of the gaseous phase of butyraldehyde from vial A1 was injected with a syringe in a 20 mL vial A5 sealed with an airtight rubber cap, then the vial was filled with nitrogen.

3 mL of the gaseous phase of benzaldehyde from vial A3 was injected with a syringe in a 20 mL vial A6 sealed with an airtight rubber cap, then the vial was filled with nitrogen.

The two vials A5 and A6 were left to sit at 23° C. for at least 12 hours to equilibrate the repartition of gaseous phase of volatile aldehyde homogeneously in the vials.

Preparation of Vials B1 and B2 Comprising a Volatile Aldehyde and an Aldehyde Scavenger C (Invention):

Two vials B1 and B2 were prepared as follow:

0.024 g of 2-aminobenzamide (solid at 23° C., melting point (mp)=111-113° C.) were introduced in a 20 mL vial B1 sealed with an airtight rubber cap, then the vial was filled with nitrogen.

The vial was left to sit at 23° C. for at least 12 hours for solid-gaz equilibration purpose.

The same operation was repeated to prepare the 20 mL vial B2 comprising 0.024 g of 2-aminobenzamide.

After equilibration period of vials B1 and B2, 3 mL of the gaseous phase of butyraldehyde from vial A2 was injected into the vial B1, and 3 mL of the gaseous phase of benzaldehyde from vial A4 was injected into the vial B2.

GC-MS analysis:

The vials A5 and B1 were heated for 20 mn at 70° C. to concentrate the vapors of butyraldehyde in the upper part of the vial (headspace area).

The vials A6 and B2 were heated for 20 mn at 70° C. to concentrate the vapors of benzaldehyde in the upper part of the vial (headspace area).

Then 2 mL sample of the gaseous phase of each vial were extracted with a syringe to be analyzed by Gas Chromatography-Mass Spectrum (GC-MS) analysis.

Results:

By comparison of the GC-MS spectra of the samples from vials A5 and B1, it was found that the peak areas of the butyraldehyde was significantly reduced in presence of 2-aminobenzamide.

Indeed, it was observed that the amount of butyraldehyde in the sample from vial B1 was reduced by 92% compared to the amount of butyraldehyde in the reference sample from vial A5.

By comparison of the GC-MS spectra of the samples from vials A6 and B2, it was found that the peak areas of the benzaldehyde was significantly reduced in presence of 2-aminobenzamide.

Indeed, it was observed that the amount of benzaldehyde in the sample from vial B2 was reduced by 84% compared to the amount of benzaldehyde in the reference sample from vial A6.

These results thus show that 2-aminobenzamide is able to efficiently neutralize a volatile aldehyde, and thus significantly reduce the emissions due to this organic volatile compound.

Effect of Aldehyde Scavenger C on Volatile Aldehydes in Two Hot Melt Adhesive Compositions:

Preparation of Vials C1 and C2 Comprising a Hot Melt Adhesive Composition without Aldehyde Scavenger C (Reference):

For comparative purpose, two vials C1 and C2 comprising respectively the hot melt adhesive compositions H2898 and H4358 sold by Bostik SA were prepared as follow:

400 g of the hot melt adhesive composition (H2898 or H4358) was heated and melted under stirring at 160° C. for 4 hour.

After cooling at 23° C., 2 g of the hot melt adhesive composition was introduced into a 20 mL vial (C1 or C2) which was then filled with nitrogen, and then sealed with an airtight rubber cap.

Preparation of Vials D1, D2 and D3 Comprising a Hot Melt Adhesive Composition Comprising Different Amount of an Aldehyde Scavenger C:

Three vials D1, D2 and D3 were prepared as follow:

400 g of the hot melt adhesive composition H2898 and 900 ppm of 2-aminobenzamide (corresponding to 0.09% by weight of an aldehyde scavenger C relative to the total weight of the hot melt adhesive composition H2898) were mixed and heated at 160° C. for 4 hours to melt the hot melt adhesive composition and get an homogeneous mixture.

After cooling at 23° C., 2 g of the homogeneous mixture was introduced into a 20 mL vial D1 which was then filled with nitrogen, and thereafter sealed with an airtight rubber cap.

400 g of the hot melt adhesive composition H4358 and 1000 ppm of 2-aminobenzamide (corresponding to 0.1% by weight of an aldehyde scavenger C relative to the total weight of the hot melt adhesive composition H4358) were mixed and heated at 160° C. for 4 hours to melt the hot melt adhesive composition and get an homogeneous mixture.

After cooling at 23° C., 2 g of the homogeneous mixture was introduced into a 20 mL vial D2 which was then filled with nitrogen, and thereafter sealed with an airtight rubber cap.

400 g of the hot melt adhesive composition H4358 and 5000 ppm of 2-aminobenzamide (corresponding to 0.5% by weight of an aldehyde scavenger C relative to the total weight of the hot melt adhesive composition H4358) were mixed and heated at 160° C. for 4 hours to melt the hot melt adhesive composition and get an homogeneous mixture.

After cooling at 23° C., 2 g of the homogeneous mixture was introduced into a 20 mL vial D3 which was then filled with nitrogen, and thereafter sealed with an airtight rubber cap.

GC-MS Analysis on Vials C1 and D1:

The vials C1 and D1 were heated for 20 mn at 140° C. to generate vapors of volatile aldehydes and concentrate the vapors of butyraldehyde in the upper part of the vial (headspace area).

Then 2 mL sample of the gaseous phase of each vial were extracted with a syringe to be analyzed by Gas Chromatography-Mass Spectrum (GC-MS) analysis.

Results:

By comparison of the GC-MS spectra of the samples from vials C1 and D1, it was found that the peak areas of the volatile aldehydes identified as butyraldehyde and nonanal were significantly reduced in presence of 2-aminobenzamide.

In particular, on the GC-MS spectra of the sample from vial D1, no peak corresponding to butyraldehyde was identified and the peak area corresponding to nonanal had significantly reduced.

Indeed, it was observed that the total amount of volatile aldehydes (benzaldehyde and nonanal) in the sample from vial D1 was reduced by 70%, leading to an overall total VOC reduction of 20%, in comparison to the reference sample from vial C1.

These results thus show that 2-aminobenzamide is able to efficiently and irreversibly neutralize volatile aldehydes and thus significantly reduce the emissions of volatile aldehydes generated in the hot melt adhesive composition when exposed to high temperature.

Odor Test Assessment on Vials C2, D2 and D3:

The odor of each composition from vials C2, D2 and D3 were assessed as follow:

20 g of the composition (from the vial C2, D2 or D3) were placed into a 300 mL glass jar and then hermetically covered with aluminum foil. The jar was then wrapped in an aluminum foil to prevent the composition from being seen and identified.

Each jar was stored in the same conditions (for 2 hours at 177° C.), to let the vapors of volatile aldehydes concentrate in the upper part of the jar. Then the jar was opened and smelled by a jury.

The jury is composed of 6 persons chosen from the average consumers and trained:

- to rate odor intensity according to an increasing odor intensity grading scale ranging from 0 to 5, the grade 0 (zero) being given when the sample is odorless and the grade 5 being given when the sample presents a very strong odor, and
- to judge the pleasantness of the odor (hedonic tone).

Results:

The results are as follow:

The average grade indicated in the table below is calculated from the grades given by each person of the jury to assess the odor intensity of the hot melt adhesive composition.

It was found unanimously that the odor intensity of the compositions from vials D2 and D3 is significantly lower (difference of grades≥1) than the odor intensity of the reference composition H4358 from vial C2.

All the persons from the jury found an obvious improvement of the odor pleasantness of the compositions from vials D2 and D3 in comparison to reference composition H4358 from vial C2.

Moreover, these results show that adding increasing amount of 2-aminobenzamide in a hot melt adhesive composition, within the range of amount used according to the invention, enabled to significantly decrease the odor intensity of hot melt adhesive composition and improve the odor pleasantness of the hot melt adhesive composition.

|  | Sample from vial C2 (without scavenger) | Sample from vial D2 (with 1000 ppm of scavenger) | Sample from vial D3 (with 5000 ppm of scavenger) |
| --- | --- | --- | --- |
| Odor intensity (average grade) | 5.0 | 3.6 | 2.6 |
| Odor pleasantness (hedonic tone) | unpleasant, irritant | more pleasant than sample from vial C2 | more pleasant than sample from vial D2 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A hot melt adhesive composition comprising:
A—at least 5% by weight of at least one thermoplastic polymer that is polyolefins, styrene block copolymers (SBC), ethylene-vinyl-acetate (EVA), or mixtures thereof ;
B—20% to 70% by weight of at least one tackifying resin;
C—0.01% to 1% by weight of at least one aldehyde scavenger having a molar weight lower than 500 g/mol and a melting point below 170° C. and comprising in its structure an aromatic ring directly or indirectly bonded to at least one amine terminated group,
D—5% to 35% by weight of at least one plasticizer chosen from naphthenic oils, paraffinic oils, and mixtures thereof;
the total content of the above mentioned ingredients totaling 100% by weight.

2. The hot melt adhesive composition according to claim 1 comprising:
A—15% to 35% by weight of the at least one thermoplastic polymer;
B—30% to 60% by weight of the at least one tackifying resin;
C—0.01% to 1% by weight of the at least one aldehyde scavenger;
D—10% to 30% by weight of the at least one plasticizer;
the total content of the above mentioned ingredients totaling 100% by weight.

3. The hot melt adhesive composition according to claim 1, wherein the at least one thermoplastic polymer is a styrene block copolymer, Ethylene-Vinyl-Acetate or a mixture thereof.

4. The hot melt adhesive composition according to claim 3, wherein the at least one thermoplastic polymer is a styrene block copolymer or a mixture of styrene block copolymers.

5. The hot melt adhesive composition according to claim 1, wherein the at least one thermoplastic polymer is a polyolefin or a mixture of polyolefins.

6. The hot melt adhesive composition according to claim 1, wherein the at least one tackifying resin has one or several carbon-carbon double bond(s).

7. The hot melt adhesive composition according to claim 1, wherein the at least one tackifying resin has no carbon-carbon double bond.

8. The hot melt adhesive composition according to claim 1, wherein the at least one aldehyde scavenger is a compound of formula (I):

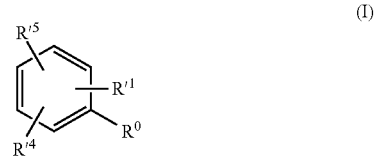

in which:
$R^0$ is $NH_2$,
$R^{\prime 1}$ is a hydrogen atom or an amine terminated group that is a primary amine $NH_2$, a secondary amine —NH—$R^{\prime 6}$, —$SO_2$—NH—$R^{\prime 3}$ or —CONH—$R^{\prime 3}$,
$R^{\prime 3}$ being a hydrogen atom or a $C_1$-$C_7$ alkyl,
$R^{\prime 6}$ being a $C_1$-$C_7$ alkyl,
$R^{\prime 4}$ and $R^{\prime 5}$ are a hydrogen atom, a $C_1$-$C_9$ alkyl group , a primary amine $NH_2$, a secondary amine —NH—$R^{\prime 6}$— or optionally $R^{\prime 4}$ and $R^{\prime 5}$ fuse together when positioned in ortho relative to each other to form a 6-member aromatic hydrocarbon ring optionally substituted by at least one $R^{\prime 7}$ group that is —$SO_2$—NH—$R^{\prime 3}$, —CONH—$R^{\prime 3}$, $R^{\prime 4}$ or $R^{\prime 5}$.

9. The hot melt adhesive composition according to claim 1, wherein the at least one aldehyde scavenger is: 2-aminobenzamide, 3-aminobenzamide, 1,8-diaminonaphthalene, 2-aminobenzenesulfonamide, benzene-1,2-diamine, or a mixture thereof.

10. The hot melt adhesive composition according to claim 1, wherein the at least one aldehyde scavenger is 2-aminobenzamide.

11. The hot melt adhesive composition according to claim 1, wherein the at least one aldehyde scavenger is present in an amount ranging from 0.09% to 0.5% by weight of the total weight of the hot melt adhesive composition.

12. The hot melt adhesive composition according to claim 1, wherein said composition further comprises:
E—from about 0.1%to about 2% by weight of at least one antioxidant; relative to the total weight of the hot melt adhesive composition.

13. An assembly product comprising at least two substrates bonded by at least one hot melt adhesive composition as defined in claim 1.

14. An assembly product according to claim 13, wherein said assembly product is a disposable nonwoven absorbent article.

15. A method of removing or reducing volatile aldehyde of a hot melt adhesive composition, comprising contacting said hot melt adhesive composition with aldehyde scavenger as in claim 1.

* * * * *